(12) United States Patent
Cao et al.

(10) Patent No.: US 12,069,735 B2
(45) Date of Patent: Aug. 20, 2024

(54) GENERATING PREAMBLES FOR RANDOM ACCESS IN WIRELESS NETWORKS

(71) Applicant: ZTE CORPORATION, Guangdong (CN)

(72) Inventors: Wei Cao, Shenzhen (CN); Nan Zhang, Shenzhen (CN); Chenchen Zhang, Shenzhen (CN); Zhen Yang, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 421 days.

(21) Appl. No.: 17/486,523

(22) Filed: Sep. 27, 2021

(65) Prior Publication Data

US 2022/0104271 A1    Mar. 31, 2022

Related U.S. Application Data

(63) Continuation of application No. PCT/CN2019/080232, filed on Mar. 28, 2019.

(51) Int. Cl.
| | |
|---|---|
| H04W 74/0833 | (2024.01) |
| H04B 7/185 | (2006.01) |
| H04L 27/26 | (2006.01) |
| H04W 74/00 | (2009.01) |

(52) U.S. Cl.
CPC .... H04W 74/0833 (2013.01); H04B 7/18513 (2013.01); H04L 27/26132 (2021.01); H04W 74/002 (2013.01)

(58) Field of Classification Search
CPC .......... H04W 74/0833; H04W 74/002; H04W 74/004; H04B 7/18513; H04L 27/26132

USPC ...................... 370/316; 455/434–435.1, 515
See application file for complete search history.

(56) References Cited

U.S. PATENT DOCUMENTS

| | | | |
|---|---|---|---|
| 2015/0016312 A1* | 1/2015 | Li | H04W 74/006 370/280 |
| 2016/0286506 A1 | 9/2016 | Chae et al. | |
| 2018/0131481 A1 | 5/2018 | Jiang et al. | |
| 2019/0274172 A1 | 9/2019 | Yoon et al. | |

(Continued)

FOREIGN PATENT DOCUMENTS

| | | |
|---|---|---|
| CN | 101217807 A | 7/2008 |
| CN | 101299620 A | 11/2008 |

(Continued)

OTHER PUBLICATIONS

EP Communication pursuant to Article 94(3) on EP Appl. No. 19920867.9, dated May 30, 2023 (6 pages).

(Continued)

*Primary Examiner* — Michael Y Mapa
(74) *Attorney, Agent, or Firm* — Foley & Lardner LLP

(57) ABSTRACT

Methods, systems, and devices for generating preambles in mobile communication technology are described. An exemplary method for wireless communication includes transmitting, by a network node, a configuration for random access comprising a value indicative of a number of Zadoff-Chu (ZC) sequence roots (M) and a number of repetitions (N), and receiving, from a wireless device, a random access preamble, wherein the random access preamble comprises M concatenated ZC sequences with different roots, and wherein each of the M concatenated ZC sequences is repeated based on N.

20 Claims, 9 Drawing Sheets

700

Transmitting, by a network node, a configuration for random access comprising a value indicative of a number of Zadoff-Chu (ZC) sequence roots (M) and a number of repetitions (N) — 710

Receiving, from a plurality of wireless devices, a plurality of random access preambles, each of the plurality of random access preambles comprising M concatenated ZC sequences with different roots — 720

(56) References Cited

U.S. PATENT DOCUMENTS

| | | | |
|---|---|---|---|
| 2020/0068617 A1* | 2/2020 | Yoon | H04W 74/006 |
| 2020/0252975 A1* | 8/2020 | Lei | H04B 7/01 |
| 2021/0168872 A1* | 6/2021 | Qi | H04W 74/0833 |
| 2022/0117003 A1* | 4/2022 | Shin | H04W 72/1263 |

FOREIGN PATENT DOCUMENTS

| | | |
|---|---|---|
| JP | 2017-522744 A | 8/2017 |
| WO | WO-2015/144256 A1 | 10/2015 |
| WO | WO-2015/191347 A1 | 12/2015 |
| WO | WO-2017/203969 A1 | 11/2017 |
| WO | WO-2018/203674 A1 | 11/2018 |
| WO | WO-2018/234851 A1 | 12/2018 |

OTHER PUBLICATIONS

Extended European Search Report for EP Appl. No. 19920867.9, dated Mar. 15, 2022 (7 pages).

First Office Action for JP Appl. No. 2021-557685, dated Feb. 1, 2023 (with English translation, 11 pages).

ZTE et al., "PRACH Design Considerations", 3GPP TSG RAN WG1 AH_NR Meeting, R1-1700103, Jan. 20, 2017, Spokane, USA (8 pages).

Written Opinion for SG Appl. No. 11202110543S, dated Dec. 4, 2023 (7 pages).

CATR: "Consideration on SS bandwidth and SS sequence design" 3GPP TSG RAN WG1 Meeting #88bis; R1-1705772; Apr. 7, 2017; Spokane, USA (5 pages).

International Search Report and Written Opinion for PCT Appl. No. PCT/CN2019/080232, mailed Dec. 27, 2019 (6 pages).

* cited by examiner

RACH-ConfigGeneric information element

```
-- ASN1START
-- TAG-RACH-CONFIG-GENERIC-START

RACH-ConfigGeneric ::=        SEQUENCE {
    prach-ConfigurationIndex      INTEGER (0..255),
    msg1-FDM                      ENUMERATED {one, two, four, eight},
    msg1-FrequencyStart           INTEGER (0..maxNrofPhysicalResourceBlocks-1),
    zeroCorrelationZoneConfig     INTEGER (0..15),
    preambleReceivedTargetPower   INTEGER (-202..-60),
    preambleTransMax              ENUMERATED {n3, n4, n5, n6, n7, n8, n10, n20, n50, n100, n200},
    powerRampingStep              ENUMERATED {dB0, dB2, dB4, dB6},
    ra-ResponseWindow             ENUMERATED {sl1, sl2, sl4, sl8, sl10, sl20, sl40, sl80},
    ...
}

-- TAG-RACH-CONFIG-GENERIC-STOP
-- ASN1STOP
```

FIG. 1

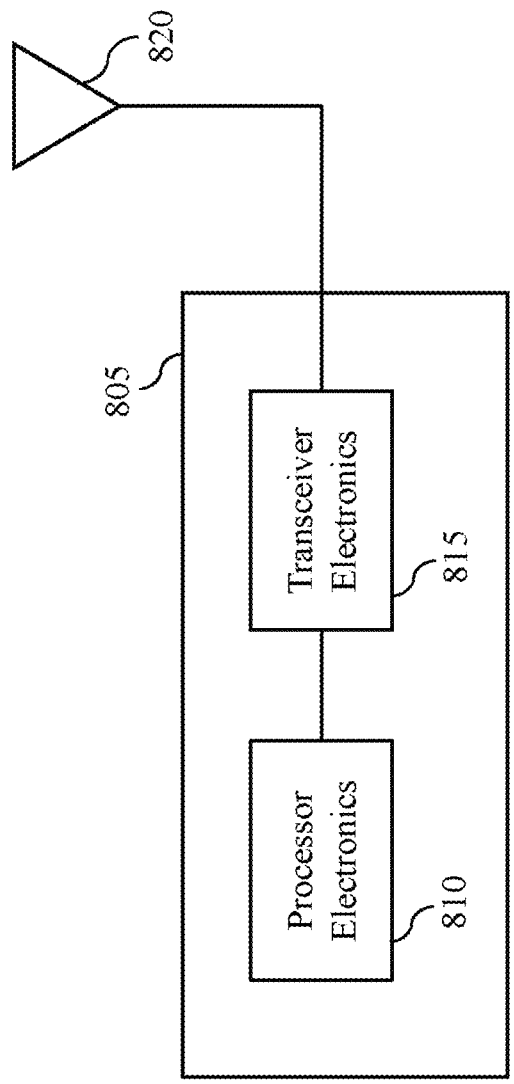

GENERATING PREAMBLES FOR RANDOM ACCESS IN WIRELESS NETWORKS

CROSS-REFERENCE TO RELATED APPLICATION

This application claims the benefit of priority under 35 U.S.C. § 120 as a continuation of PCT Patent Application No. PCT/CN2019/080232, filed on Mar. 28, 2019, the disclosure of which is incorporated herein by reference in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates and communications with satellite-based base stations, thereby requiring user equipment to implement preambles that are resilient to long propagation delays.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes transmitting, by a network node, a configuration for random access comprising a value indicative of a number of Zadoff-Chu (ZC) sequence roots (M) and a number of repetitions (N), and receiving, from a wireless device, a random access preamble, wherein the random access preamble comprises M concatenated ZC sequences with different roots, and wherein each of the M concatenated ZC sequences is repeated based on N.

In another exemplary aspect, a wireless communication method is disclosed. The method includes receiving, from a network node, a configuration for random access comprising a value indicative of a number of Zadoff-Chu (ZC) sequence roots (M) and a number of repetitions (N), and transmitting, by a wireless device, a random access preamble, wherein the random access preamble comprises M concatenated ZC sequences with different roots, and wherein each of the M concatenated ZC sequences is repeated based on N.

In yet another exemplary aspect, a wireless communication method is disclosed. The method includes transmitting, by a network node, a configuration for random access comprising a value indicative of a number of Zadoff-Chu (ZC) sequence roots (M) and a number of repetitions (N), and receiving, from a plurality of wireless devices, a plurality of random access preambles, wherein each of the plurality of random access preambles comprises M concatenated ZC sequences with different roots, wherein each of the M concatenated ZC sequences is repeated based on N, and wherein each ZC sequence in the plurality of random access preambles has a fixed common cyclic shift.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 1 shows an example of a configuration used to identify preambles in the New Radio (NR) specification.

FIG. 8 is a block diagram representation of a portion of an apparatus, in accordance with some embodiments of the presently disclosed technology.

DETAILED DESCRIPTION

Figure 2A:
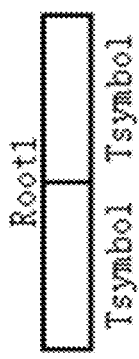
FIGS. 2A, 2B and 2C show examples of the Physical Random Access Channel (PRACH) preamble structure, in accordance with some embodiments of the presently disclosed technology.

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

With the development of the NR access technologies (e.g., 5G), a broad range of use cases including enhanced mobile broadband, massive machine-type communications (MTC), critical MTC, etc., can be realized. To expand the utilization of NR access technologies, 5G connectivity via satellites is being considered as a promising application. In contrast to the terrestrial networks where all communication nodes (e.g., base stations) are located on the earth, a network incorporating satellites and/or airborne vehicles to perform some or all of the functions of terrestrial base stations is referred to as a non-terrestrial network (NTN).

In NTNs, the coverage of a satellite is generally implemented by multiple beams. And the coverage of a beam is generally much larger than that of a terrestrial cell. For example, a satellite beam footprint diameter could be hundreds of kilometers or even larger. Different beams of a satellite have various minimum elevation angles, which means the differential round-trip delay (RTD) of each beam can be very different. A challenging topic brought by various differential RTD is how to effectively support random access from simultaneous UEs.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Examples of Random Access Procedures in NR Systems

In the example of the NR system, the following PRACH preamble formats are defined in Tables 1 and 2, quoted from NR specification, 3GPP TS38.211 (and which correspond to Tables 6.3.3.1-1 and 6.3.3.1-2, respectively).

TABLE 1

PRACH preamble formats for $L_{RA} = 839$ and $\Delta f^{RA} = \{1.25, 5\}$ kHz

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 2 · 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

TABLE 2

PRACH preamble formats for $L_{RA} = 139$ and $\Delta f^{RA} = 15 \cdot 2^\mu$ kHz where $\mu = \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A1 | 139 | 15 · 2$^\mu$ kHz | 2 · 2048κ · 2$^{-\mu}$ | 288κ · 2$^{-\mu}$ | — |
| A2 | 139 | 15 · 2$^\mu$ kHz | 4 · 2048κ · 2$^{-\mu}$ | 576κ · 2$^{-\mu}$ | — |
| A3 | 139 | 15 · 2$^\mu$ kHz | 6 · 2048κ · 2$^{-\mu}$ | 864κ · 2$^{-\mu}$ | — |
| B1 | 139 | 15 · 2$^\mu$ kHz | 2 · 2048κ · 2$^{-\mu}$ | 216κ · 2$^{-\mu}$ | — |
| B2 | 139 | 15 · 2$^\mu$ kHz | 4 · 2048κ · 2$^{-\mu}$ | 360κ · 2$^{-\mu}$ | — |
| B3 | 139 | 15 · 2$^\mu$ kHz | 6 · 2048κ · 2$^{-\mu}$ | 504κ · 2$^{-\mu}$ | — |
| B4 | 139 | 15 · 2$^\mu$ kHz | 12 · 2048κ · 2$^{-\mu}$ | 936κ · 2$^{-\mu}$ | — |
| C0 | 139 | 15 · 2$^\mu$ kHz | 2048κ · 2$^{-\mu}$ | 1240κ · 2$^{-\mu}$ | — |
| C2 | 139 | 15 · 2$^\mu$ kHz | 4 · 2048κ · 2$^{-\mu}$ | 2048κ · 2$^{-\mu}$ | — |

With legacy PRACH preambles, simultaneous UEs are distinguished by their chosen preamble roots and cyclic shifts. In NTN, however, it may not work anymore due to various differential delay experienced by different UEs in the same beam. The large differential delay leads to correlation peak shifting in the whole preamble symbol, which means cyclic shift cannot be used any more.

Examples of Configuration Parameters

Due to huge differential RTD in NTN scenario, the cyclic shift of ZC sequence cannot be used to identify different preambles. Therefore, the configuration of cyclic shift is not needed. In current NR specification, cyclic shift configuration $N_{cs}$ is determined by following IE named zeroCorrelationZoneConfig, as shown in FIG. 1.

If the differential RTD in a beam is larger than a single preamble symbol duration $T_{symbol}$, then the IE zeroCorrelationZoneConfig is invalid. Thus, in some embodiments, zeroCorrelationZoneConfig should be designated as an optional parameter, with its presence being dependent on the condition "differential RTD<$T_{symbol}$" being true.

In some embodiments, two new parameters may be introduced. The first is M, referring to the number of roots used in a PRACH preamble. The other is N, referring to the repetition number of preamble symbols generated by a single root. The presence of M and N depends on the condition "differential RTD>$T_{symbol}$" being true. Thus, either "M and N" or zeroCorrelationZoneConfig are needed to define a PRACH preamble format.

Examples of Preamble Structures

Figure 2B:
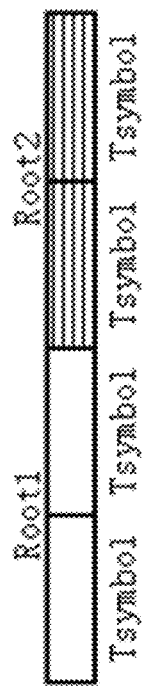
Figure 2C:
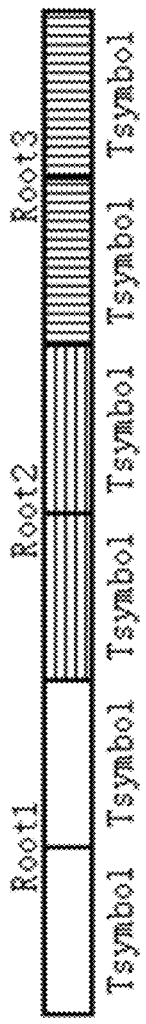
Figure 3:
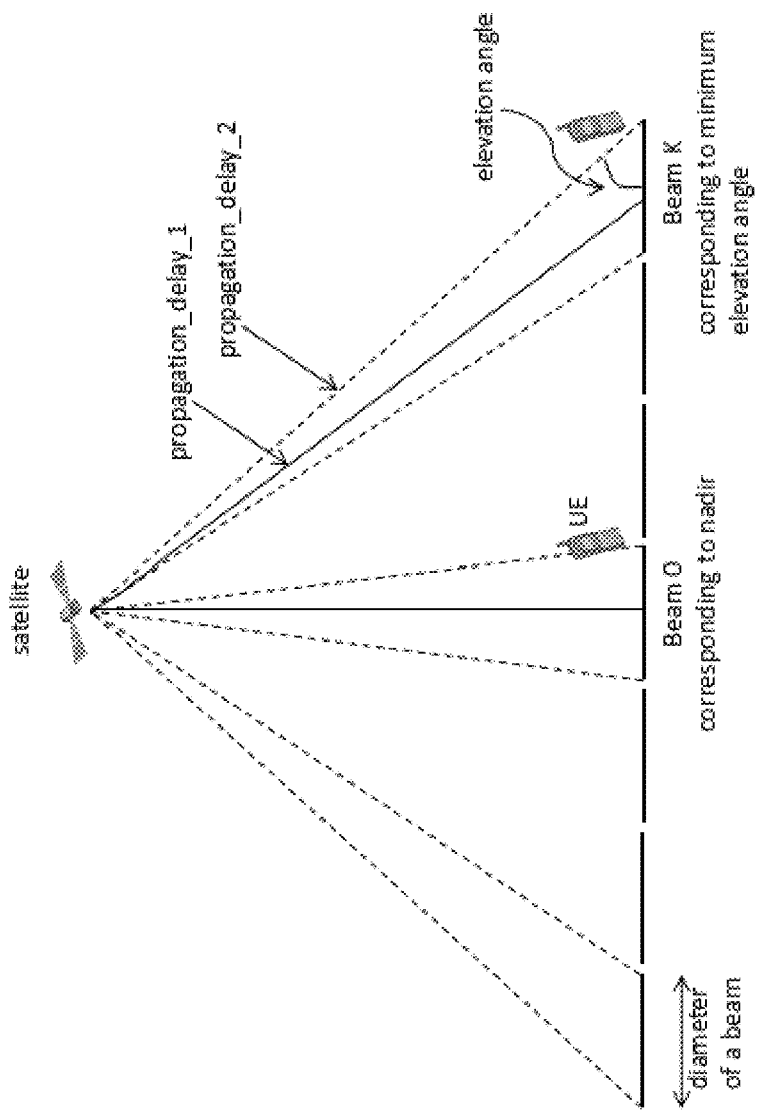
FIG. 3 shows an example of satellite communication.

Exemplary structures of the PRACH preamble, based on embodiments of the disclosed technology, are shown in FIGS. 2A-2C.

Option 1. A preamble symbol is first generated using Root1. Then it is repeated N times to form a Root1 based preamble, with N≥1. As shown in FIG. 2A, and without loss of generality, N=2 and the total preamble length is $T_{preamble}=2 \times T_{symbol}$. In this example, the repeated preamble may be interpreted as a cyclic prefix (CP) enhancement of the current NR PRACH preamble, e.g., $N_{CP}^{RA}$ is extended to the length of a preamble symbol. A larger value of N provides better coverage at the cost of a longer preamble transmission.

Option 2. A preamble symbol is first generated using Root1. Then it is repeated N times to form a Root1 based preamble, with N≥1. This is followed by generated another preamble symbol using Root2, which is also repeated N times. The two parts are concatenated in the time domain to form a preamble. As shown in FIG. 2B, and without loss of generality, N=2 and the total preamble length is $T_{preamble}=4 \times T_{symbol}$. In this example, the repeated preamble may be interpreted as a cyclic prefix (CP) enhancement of the current NR PRACH preamble per root, e.g., $N_{CP}^{RA}$ is extended to the length of a preamble symbol. This construction may be extended to use M roots to form the preamble, which is shown in FIG. 2C with M=3. In general, the total preamble length is defined as $T_{preamble}=M \times N \times T_{symbol}$.

In some embodiments, the preamble index for the above construction may be defined as the permutation {Root1, Root2, . . . RootM}, and as compared to the preamble index {Root, CyclicShift} that is used in the current NR specification.

In some embodiments, each of the RootM-based preamble may be repeated two or more times, that may not necessarily be equal. For example, Root1 may be repeated $N_1$ times, Root2 may be repeated $N_2$ times, and so on. In this scenario, the total preamble length is defined as $T_{preamble}=(N_1+N_2+ \ldots +N_M) \times T_{symbol}$.

Exemplary Embodiments of the Disclosed Technology

Figure 4A:
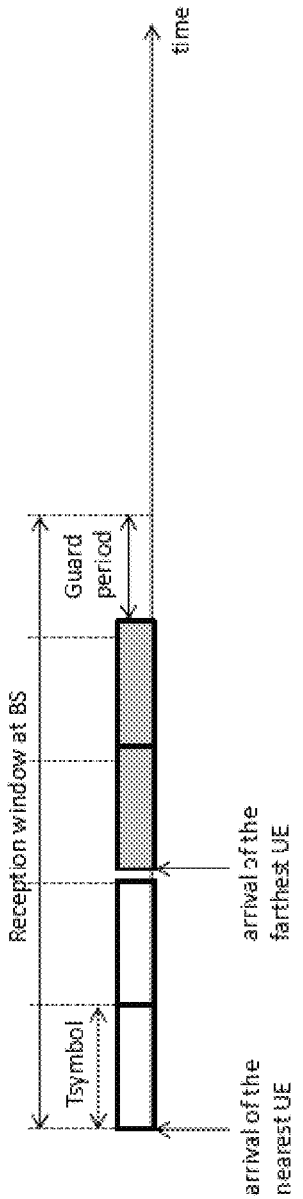
FIGS. 4A, 4B and 4C show examples of the arrival times of preambles, in accordance with some embodiments of the presently disclosed technology.
Figure 4B:
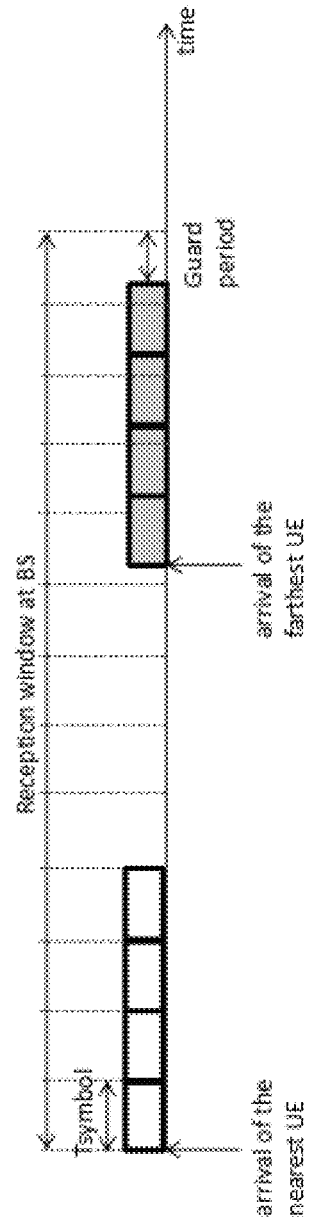
Figure 4C:
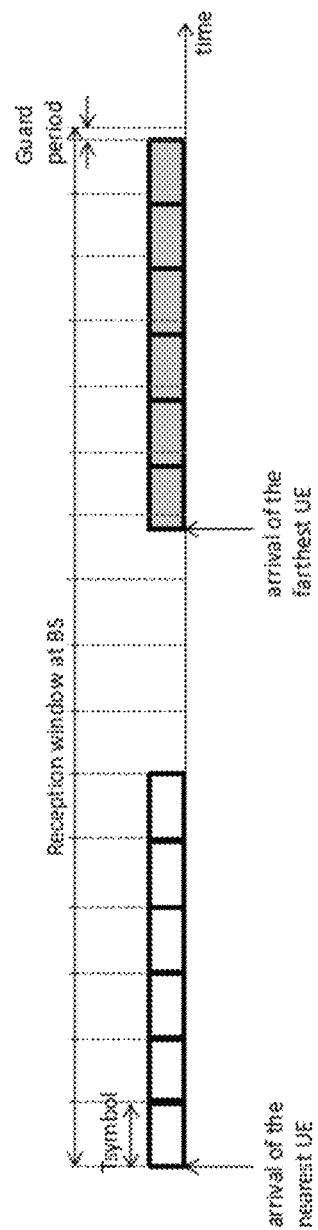

The following cases, in conjunction with FIGS. 4A-4C, show different examples of some embodiments of the presently disclosed technology.

Case 1. Generally a satellite has multiple beams with different elevation angles. As shown in FIG. 4A, Beam 0 has a maximum elevation angle and Beam K has a minimum elevation angle (e.g., 10 degree). In each beam, a center point with minimum propagation delay can be determined, which is represented by "propagation_delay_1" in FIG. 4A. The propagation_delay_1 is broadcast in this beam. All the UEs in this beam use (2*propagation_delay_1) to pre-compensate its PRACH preamble transmission. From the viewpoint of BS on satellite, the PRACH preambles from this beam have a time uncertainty range of [0, 2*(propagation_delay_2−propagation_delay_1)], where propagation_delay_2 is the maximum propagation delay in this beam.

The following assumptions are made in this scenario:
The satellite is in a geostationary orbit (GEO) with orbit altitude of 35,786 km.
The minimum elevation angle corresponding to Beam K is 10 degree.
The diameter of a beam is 500 km.
The PRACH preamble subcarrier spacing is 1.25 kHz, and a symbol length is 0.8e-3 second (=1/1.25 kHz).
The ZC sequence length is 839 or 139.
The PRACH preamble uses the structure shown in FIG. 2A with M=1 and N=2. Therefore the PRACH preamble length is $T_{preamble} = M \times N \times T_{symbol} = 2 \times T_{symbol}$.
A fixed cyclic shift of the ZC sequence is used by all UEs in this beam; without loss of generality, it is assumed to be 0.
A preamble pool with 64 preamble indexes per cell is assumed.

For these assumptions, the preamble format used is shown in the table below.

| $L_{RA}$ | $\Delta f^{RA}$ | $N_u$ | root per preamble M | Repetition number N |
|---|---|---|---|---|
| 839 or 139 | 1.25 kHz | 24576κ | 1 | 2 |

In the above table, $N_u$ refers to a single preamble length, and the preamble symbol repetition is defined by the parameter N.

In this scenario, maximum differential delay of Beam K is calculated as 1.6279e-3 seconds. From the viewpoint of BS on satellite, the PRACH preambles from Beam K will have a time uncertainty range of [0, 1.6279e-3] second, which is [0, 3] with normalization to symbol length $T_{symbol}$. The total reception window at BS is the summation of time uncertainty range and PRACH preamble length, which is 5 (=3+2) with normalization to symbol length $T_{symbol}$.

At the BS, and as shown in FIG. 4A, the following possible PRACH preamble arrivals are possible. In some embodiments, the reception window consists of 5 detection windows of length $T_{symbol}$. With repetition N≥2, it is guaranteed that a complete symbol can be captured in a single detection window of length $T_{symbol}$. In some embodiments, N=1 and the receiver uses a sliding correlation window in the time domain to detect the preamble.

In some embodiments, multiple UEs can be distinguished by their randomly chosen ZC roots. In other embodiments, if two UEs chose the same root, but with distinguishable arrival time, they can also be detected.

Case 2. The following assumptions are made in this scenario:
The satellite is in a geostationary orbit (GEO) with orbit altitude of 35,786 km.
The minimum elevation angle corresponding to Beam K is 10 degree.
The diameter of a beam is 500 km.
The PRACH preamble subcarrier spacing is 5 kHz, and a symbol length is 0.2e-3 second (=⅕ kHz).
The ZC sequence length is 839 or 139.
The PRACH preamble uses the structure shown in FIG. 2B with M=2 and N=2. Therefore the PRACH preamble length is $T_{preamble} = M \times N \times T_{symbol} = 4 \times T_{symbol}$.
A fixed cyclic shift of the ZC sequence is used by all UEs in this beam; without loss of generality, it is assumed to be 0.
A preamble pool with 64 preamble indexes per cell is assumed.

For these assumptions, the preamble format used is shown in the table below.

| $L_{RA}$ | $\Delta f^{RA}$ | $N_u$ | root per preamble M | Repetition number N |
|---|---|---|---|---|
| 839 or 139 | 5 kHz | 6144κ | 2 | 2 |

In the above table, $N_u$ refers to a single preamble length, and the preamble symbol repetition is defined by the parameter N.

In this scenario, maximum differential delay of Beam K is calculated as 1.6279e-3 seconds. From the viewpoint of BS on satellite, the PRACH preambles from Beam K will have a time uncertainty range of [0, 1.6279e-3] second, which is [0, 9] with normalization to symbol length $T_{symbol}$. The total reception window at BS is the summation of time uncertainty range and PRACH preamble length, which is 13 (=9+4) with normalization to symbol length $T_{symbol}$.

At the BS, and as shown in FIG. 4A, the following possible PRACH preamble arrivals are possible. In some embodiments, the reception window consists of 13 detection windows of length $T_{symbol}$. With repetition N≥2, it is guaranteed that a complete symbol can be captured in a single detection window of length $T_{symbol}$. In some embodiments, N=1 and the receiver uses a sliding correlation window in the time domain to detect the preamble.

In some embodiments, multiple UEs can be distinguished by their randomly chosen ZC roots. In this example, 8 (= $\sqrt{64}$) roots are needed per cell to build a preamble pool with 64 preamble indexes. In other embodiments, if two UEs chose the same root, but with distinguishable arrival time, they can also be detected.

Case 3. The following assumptions are made in this scenario:
The satellite is in a low-earth orbit (LEO) with orbit altitude of 600 km.
The minimum elevation angle corresponding to Beam K is 10 degree.
The diameter of a beam is 200 km.
The PRACH preamble subcarrier spacing is 15 kHz, and a symbol length is 6.67e-5 second (=1/15 kHz).
The ZC sequence length is 139.
The PRACH preamble uses the structure shown in FIG. 2C with M=3 and N=2. Therefore the PRACH preamble length is $T_{preamble} = M \times N \times T_{symbol} = 6 \times T_{symbol}$.
A fixed cyclic shift of the ZC sequence is used by all UEs in this beam; without loss of generality, it is assumed to be 0.
A preamble pool with 64 preamble indexes per cell is assumed.

For these assumptions, the preamble format used is shown in the table below.

| $L_{RA}$ | $\Delta f^{RA}$ | $N_u$ | root per preamble M | Repetition number N |
|---|---|---|---|---|
| 139 | 15 kHz | 2048κ | 3 | 2 |

In the above table, $N_u$ refers to a single preamble length, and the preamble symbol repetition is defined by the parameter N.

In this scenario, maximum differential delay of Beam K is calculated as 6.5324e-4 seconds. From the viewpoint of BS on satellite, the PRACH preambles from Beam K will have a time uncertainty range of [0, 6.5324e-4] second, which is [0, 10] with normalization to symbol length $T_{symbol}$. The total reception window at BS is the summation of time uncertainty range and PRACH preamble length, which is 16 (=10+6) with normalization to symbol length $T_{symbol}$.

At the BS, and as shown in FIG. 4C, the following possible PRACH preamble arrivals are possible. In some embodiments, the reception window consists of 16 detection windows of length $T_{symbol}$. With repetition N≥2, it is guaranteed that a complete symbol can be captured in a single detection window of length $T_{symbol}$. In some embodiments, N=1 and the receiver uses a sliding correlation window in the time domain to detect the preamble.

In some embodiments, multiple UEs can be distinguished by their randomly chosen ZC roots. In this example, $$4(=\sqrt[3]{64})$$

roots are needed per cell to build a preamble pool with 64 preamble indexes. In other embodiments, if two UEs chose the same root, but with distinguishable arrival time, they can also be detected.

Exemplary Methods for the Generating Preambles in Satellite-Based Systems

Embodiments of the disclosed technology provide using a preamble pool that consists of ZC roots only, and wherein different cyclic shifts of ZC sequence are NOT used to identify different preambles. A fixed cyclic shift (e.g., zero) is always used for all ZC sequences in a preamble pool. Furthermore, multiple roots can be used to identify different preambles, where permutation of the multiple roots forms a preamble pool. The PRACH preamble format proposed by embodiments of the disclosed technology is characterized by repetition of preamble symbols with one or more roots.

The embodiments described in this patent document advantageously enable random access in NTN with large differential delay among UEs, and using permutation of multiple roots to build a preamble pool can effectively limit the number of roots used per cell, which is beneficial for short ZC sequence usage, low-complexity receiver design and practical cell deployment.

Figure 5:
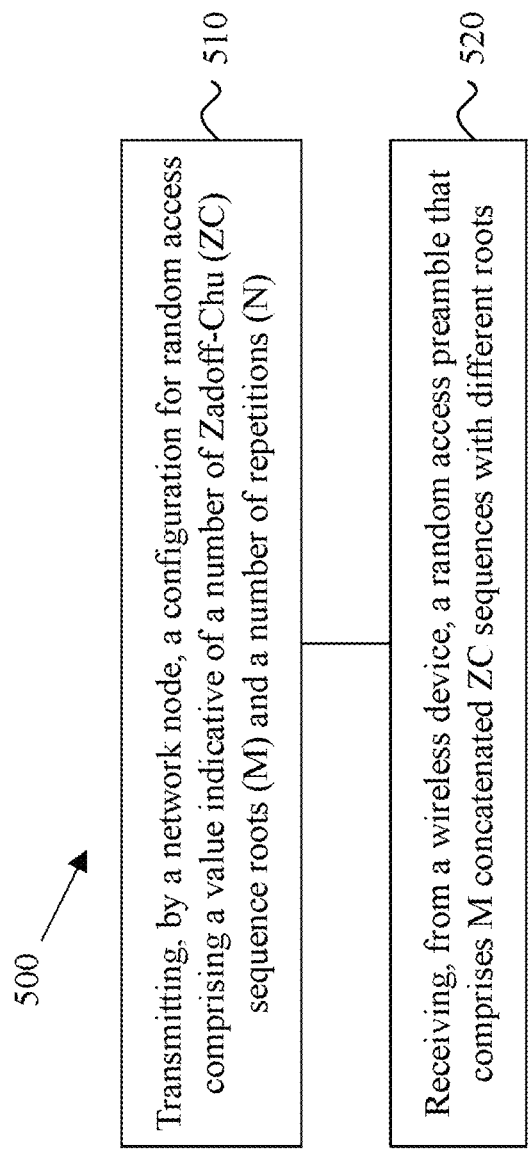
FIG. 5 shows an example of a wireless communication method, in accordance with some embodiments of the presently disclosed technology.

FIG. 5 shows an example of a wireless communication method 500. In some embodiments, the method 500 may be used for generating preambles in a satellite-based mobile communication technology. The method 500 includes, at step 510, transmitting, by a network node, a configuration for random access comprising a value indicative of a number of Zadoff-Chu (ZC) sequence roots (M) and a number of repetitions (N).

The method 500 includes, at step 520, receiving, from a wireless device, a random access preamble. The step 520 may also be implemented by the network node. In some embodiments, the random access preamble comprises M concatenated ZC sequences with different roots, and each of the M concatenated ZC sequences is repeated based on N.

In some embodiments, the one or more random access preambles is received in a reception window with a size that is based on M and N.

Figure 6:
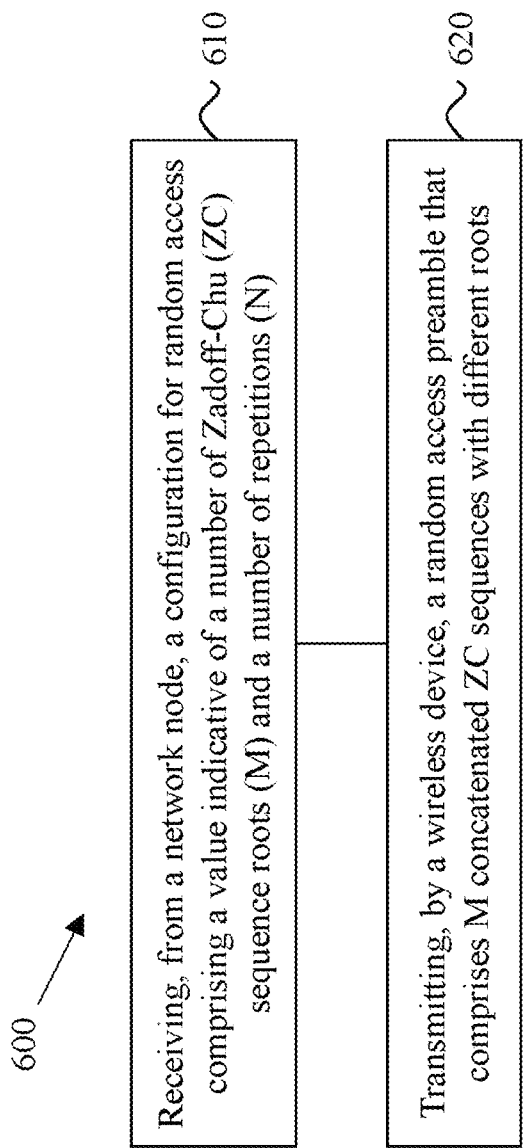
FIG. 6 shows another example of a wireless communication method, in accordance with some embodiments of the presently disclosed technology.

FIG. 6 shows an example of a wireless communication method 600 for generating preambles in a satellite-based mobile communication technology. The method 600 may be implemented by a wireless device. The method 600 includes, at step 610, receiving, from a network node, a configuration for random access comprising a value indicative of a number of Zadoff-Chu (ZC) sequence roots (M) and a number of repetitions (N).

The method 600 includes, at step 620, transmitting, by a wireless device, a random access preamble. In some embodiments, the random access preamble comprises M concatenated ZC sequences with different roots, and each of the M concatenated ZC sequences is repeated based on N.

Figure 7:
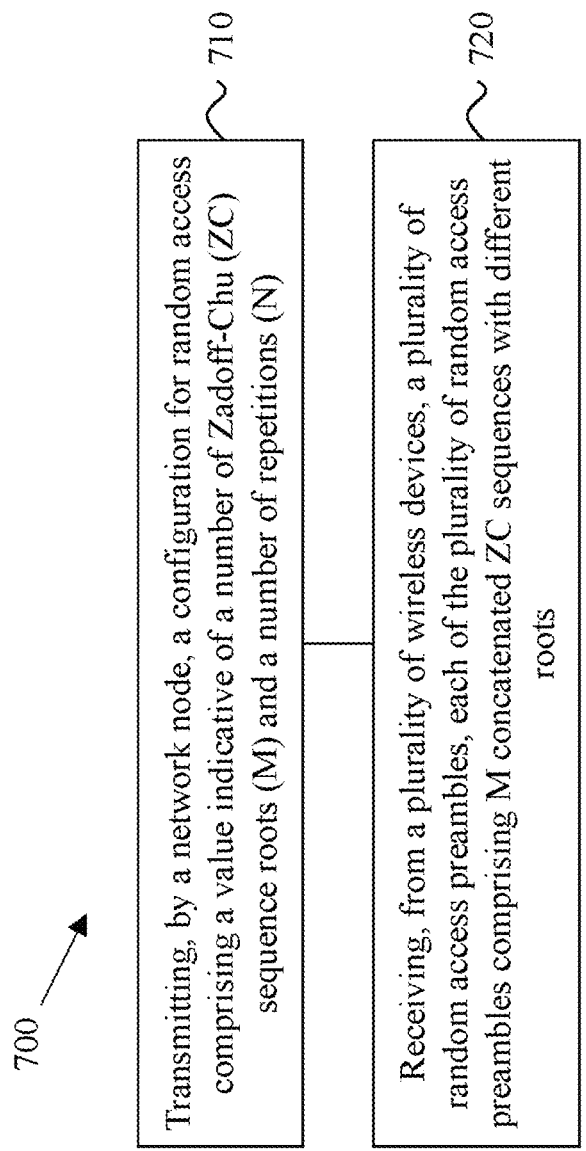
FIG. 7 shows yet another example of a wireless communication method, in accordance with some embodiments of the presently disclosed technology.

FIG. 7 shows an example of a wireless communication method 700 for generating preambles in a satellite-based mobile communication technology. The method 700 includes, at step 710, transmitting, by a network node, a configuration for random access comprising a value indicative of a number of Zadoff-Chu (ZC) sequence roots (M) and a number of repetitions (N).

The method 700 includes, at step 720, receiving, from a plurality of wireless devices, a plurality of random access preambles. In some embodiments, each of the plurality of random access preambles comprises M concatenated ZC sequences with different roots, each of the M concatenated ZC sequences is repeated based on N, and each ZC sequence in the plurality of random access preambles has a fixed common cyclic shift.

In some embodiments, and in the context of methods 500, 600 and 700, each ZC sequence has a fixed common cyclic shift. In an example, the fixed common cyclic shift may be zero. In another example, the fixed common cyclic shift may be a non-zero value (in symbols) less than the length of the ZC sequence.

In some embodiments, a difference between a first round-trip delay time between the network node and a first wireless device and a second round-trip delay time between the network node and a second wireless device is greater than a symbol time ($T_{symbol}$) that is a time duration of the ZC sequence. In an example, a length of the random access preamble is $M \times N \times T_{symbol}$.

In some embodiments, a length of the ZC sequence is 839 symbols or 139 symbols.

In some embodiments, a satellite comprises the network node.

Implementations for the Disclosed Technology

FIG. 8 is a block diagram representation of a portion of an apparatus, in accordance with some embodiments of the presently disclosed technology. An apparatus 805, such as a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805. The apparatus 805 may be used to implement the various techniques described with respect to a network node (e.g., a base station, an eNodeB or a gNodeB) or a wireless device such as a UE or another mobile-communication capable device.

It will be appreciated that the present document discloses techniques that may be used by various implementations of wireless devices or network-side devices for generating preambles that may be used for random access transmissions. In one advantageous aspect, the random access preambles may exhibit a mathematical property that makes them suitable for long-delay communication such as wireless communication with satellite networks. For example, using distinct ZC roots (instead of distinct ZC cyclic shifts) ensures that concurrent transmissions from multiple UEs can be distinguished by a satellite. If ZC cyclic shifts were to be used, the long propagation delays experienced in satellite communication may result in one or more of the cyclic shifts to overlap, resulting in the satellite not being able to correctly decode the UE signals and leading to degraded performance.

Furthermore, embodiments of the disclosed technology enable the generation of a preamble pool that maintain the aforementioned benefits, but additionally allows the number of ZC roots used to be configured based on system requirements, which enables the use of low-complexity receivers and practically implementable cellular deployments.

It is intended that the specification, together with the drawings, be considered exemplary only, where exemplary means an example and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method for wireless communication comprising:
transmitting, by a network node, a configuration for random access comprising a value indicative of a number of Zadoff-Chu (ZC) sequence roots (M) and a number of repetitions (N); and
receiving, from a wireless device, a random access preamble,
wherein the random access preamble comprises M concatenated ZC sequences with different roots, and wherein each of the M concatenated ZC sequences is repeated based on N.

2. The method of claim 1, wherein the random access preamble is received in a reception window with a size that is based on M and N.

3. The method of claim 1, wherein one of the M concatenated ZC sequences has a fixed common cyclic shift.

4. The method of claim 1, wherein a difference between a first round-trip delay time between the network node and a first wireless device and a second round-trip delay time between the network node and a second wireless device is greater than a symbol time ($T_{symbol}$) that is a time duration of one of the M concatenated ZC sequences.

5. The method of claim 4, wherein a length of the random access preamble is $M \times N \times T_{symbol}$.

6. The method of claim 1, wherein a length of one of the M concatenated ZC sequences is 839 symbols or 139 symbols.

7. The method of claim 1, wherein a satellite comprises the network node.

8. The method of claim 1, comprising:
receiving, from a plurality of wireless devices, a plurality of random access preambles,
wherein each of the plurality of random access preambles comprises M concatenated ZC sequences with different roots, wherein each ZC sequence in the plurality of random access preambles has a fixed common cyclic shift.

9. A method for wireless communication, comprising:

receiving, from a network node, a configuration for random access comprising a value indicative of a number of Zadoff-Chu (ZC) sequence roots (M) and a number of repetitions (N); and transmitting, by a wireless device, a random access preamble, wherein the random access preamble comprises M concatenated ZC sequences with different roots, and wherein each of the M concatenated ZC sequences is repeated based on N.

10. The method of claim 9, wherein each the M concatenated ZC sequences has a fixed common cyclic shift.

11. The method of claim 9, wherein a difference between a first round-trip delay time between the network node and a first wireless device and a second round-trip delay time between the network node and a second wireless device is greater than a symbol time ($T_{symbol}$) that is a time duration of the ZC sequence.

12. The method of claim 11, wherein a length of the random access preamble is $M \times N \times T_{symbol}$.

13. The method of claim 8, wherein a length of the ZC sequence is 839 symbols or 139 symbols.

14. The method of claim 8, wherein a satellite comprises the network node.

15. A wireless communications apparatus, comprising:
at least one processor configured to:
transmitting, via a transceiver, a configuration for random access comprising a value indicative of a number of Zadoff-Chu (ZC) sequence roots (M) and a number of repetitions (N); and
receiving, via the transceiver from a wireless device, a random access preamble,
wherein the random access preamble comprises M concatenated ZC sequences with different roots, and wherein each of the M concatenated ZC sequences is repeated based on N.

16. The wireless communications apparatus of claim 15, wherein the random access preamble is received in a reception window with a size that is based on M and N.

17. The wireless communications apparatus of claim 15, wherein one of the M concatenated ZC sequences has a fixed common cyclic shift.

18. The wireless communications apparatus of claim 15, wherein a difference between a first round-trip delay time between the wireless communications apparatus and a first wireless device and a second round-trip delay time between the wireless communications apparatus and a second wireless device is greater than a symbol time ($T_{symbol}$) that is a time duration of one of the M concatenated ZC sequences.

19. The wireless communications apparatus of claim 18, wherein a length of the random access preamble is $M \times N \times T_{symbol}$.

20. The wireless communications apparatus of claim 15, wherein a length of one of the M concatenated ZC sequences is 839 symbols or 139 symbols.

* * * * *